United States Patent
Yamanishi et al.

(10) Patent No.: US 7,353,214 B2
(45) Date of Patent: Apr. 1, 2008

(54) OUTLIER DETERMINATION RULE GENERATION DEVICE AND OUTLIER DETECTION DEVICE, AND OUTLIER DETERMINATION RULE GENERATION METHOD AND OUTLIER DETECTION METHOD THEREOF

(75) Inventors: Kenji Yamanishi, Tokyo (JP); Jun-ichi Takeuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 546 days.

(21) Appl. No.: 10/179,374

(22) Filed: Jun. 25, 2002

(65) Prior Publication Data
US 2003/0004902 A1    Jan. 2, 2003

(30) Foreign Application Priority Data
Jun. 27, 2001  (JP) ............................. 2001-194077

(51) Int. Cl.
G06F 17/00  (2006.01)
G06N 5/02   (2006.01)
(52) U.S. Cl. .............................. 706/46; 706/12; 706/14
(58) Field of Classification Search .................. 706/46, 706/12, 14; 600/544; 700/1
See application file for complete search history.

(56) References Cited

U.S. PATENT DOCUMENTS 5,299,284 A * 3/1994 Roy ............................. 706/20
5,816,247 A * 10/1998 Maynard ..................... 600/544
6,424,929 B1 * 7/2002 Dawes ......................... 702/179
6,556,957 B1 * 4/2003 Daumer ....................... 702/193
6,643,629 B2 * 11/2003 Ramaswamy et al. ......... 706/45
2001/0013026 A1 * 8/2001 Shaffer ......................... 706/12

FOREIGN PATENT DOCUMENTS

JP      2001-101154     4/2001

OTHER PUBLICATIONS

Tiziano Tommasini et al, Making Good Features Track Better, IEEE, 10.1109/CVPR.1998.698606, 178-183.*
Michael Berthold, Fuzzy Models and Potential Outliers, Apr. 1999, IEEE, 0-7803-5211, 532-535.*
T. Fawcett and F. Provost, "Combining Data Mining and Machine Learning for Effective Fraud Detection", Proceedings of AI Approaches to Fraud Detection and Risk Management, pp. 14-19, 1997.

(Continued)

*Primary Examiner*—Joseph P Hirl
(74) *Attorney, Agent, or Firm*—Scully, Scott, Murphy & Presser, P.C.

(57) ABSTRACT

An outlier detection device for detecting abnormal data in a data set an outlier rule preservation unit, a filtering unit, a degree of outlier calculation unit, a sampling unit, and a supervised learning unit. The supervised learning unit generates a new rule characterizing abnormal data by supervised learning based on a set of the respective data to which a label indicating whether data is abnormal data or not is applied. The new rule is added to the set of rules held in the outlier rule preservation unit to update the rules. The filtering unit uses the rules for determining whether each data of the data set is abnormal or not. The abnormal data is compared to normal data for calculating a degree of abnormality by the degree of outlier calculation unit.

21 Claims, 12 Drawing Sheets

OTHER PUBLICATIONS

J. Ryan, M. Lin and R. Miikkulainen, "Intrusion Detection with Neural Networks", Proceedings of AI Approaches to Fraud Detection and Risk Management, pp. 72-77, 1997.

P. Burge and J. Shawe-Taylor, "Detecting Cellular Fraud Using Adaptive Prototypes", Proceedings of AI Approaches to Fraud Detection and Risk Management, pp. 9-13, 1997.

K. Yamanishi, et al., "On-line Unsupervised Outlier Detection Using Finite Mixtures with Discounting Learning Algorithms", Proceedings of the Sixth ACM SIGKDD International Conference on Knowledge Discovery and Data Mining, ACM Press, pp. 320-324, 2000.

K. Yamanishi, "A Learning Criterion for Stochastic Rules", Machine Learning, Kluwer Academic Publishers, Boston, 9, pp. 165-203, 1992.

J. Ryan, et al., "Intrusion detection with neural networks", Proceedings of AI Approaches to Fraud Detection and Risk Management, pp. 72-77, 1997.

E.M. Knorr, et al., "Finding Intensional Knowledge of Distance-Based Outliers", Proceedings of the 25th International Conference on Very Large Data Bases, pp. 211-222, 1999.

Japanese Office Action dated Dec. 20, 2005, together with English-language translation.

Berthold, Michael, "Fuzzy Models and Potential Outliers", Fuzzy Information Processing Society. NAFIPS. 18th International Conference of the North American Fuzzy Information Processing Society (1999), pp. 532-535.

\* cited by examiner

OUTLIER DETERMINATION RULE GENERATION DEVICE AND OUTLIER DETECTION DEVICE, AND OUTLIER DETERMINATION RULE GENERATION METHOD AND OUTLIER DETECTION METHOD THEREOF

BACKGROUND OF THE INVENTION

1. Field of the Invention

The present invention relates to an outlier determination rule generation device and an outlier detection device for conducting statistical outlier detection, unfairness detection and fraud detection, and an outlier determination rule generation method and an outlier detection method thereof.

2. Description of the Related Art

Unfairness detection (abnormality detection, fraud detection) using machine learning techniques is roughly classified into two systems, a system based on supervised learning and a system based on unsupervised learning.

Among well-known systems based on supervised learning are that proposed by T. Fawcett and F. Provost ("Combining Data Mining and Machine Learning for Effective Fraud Detection", Proceedings of AI Approaches to Fraud Detection and Risk Management, pp. 14-19, 1997) and that proposed by J. Ryan, M. Lin and R. Miikkulainen ("Intrusion Detection with Neural Networks", Proceedings of AI Approaches to Fraud Detection and Risk Management, pp. 72-77, 1997).

Supervised learning needs "labeled data", data with a label (supervisor information) attached thereto in advance which indicates that data is abnormal (unfair) or not. In supervised learning, based on such past data, features of abnormal data are learned for use in the detection of abnormal data. Unfairness detection, for example, is conducted by collating data of past unfairness with data to be examined and is therefore incapable of coping with detection of unfairness having new features.

On the other hand, unsupervised learning detects abnormal data (unfair data) without requiring such labeled data. Systems based on unsupervised learning make use of the idea of statistical outlier detection, among which well-known are the system proposed by P. Burge and J. Shawe-Taylor ("Detecting Cellular Fraud Using Adaptive Prototypes", Proceedings of AI Approaches to Fraud Detection and Risk Management, pp. 9-13, 1997) and the system proposed by K. Yamanishi et al. ("On-line Unsupervised Outlier Detection Using Finite Mixtures with Discounting Learning Algorithms", Proceedings of the Sixth ACM SIGKDD International Conference on Knowledge Discovery and Data Mining, ACM Press, pp. 320-324, 2000).

Statistical outlier detection here denotes a technique of considering data outside a probability distribution which the majority of data follow (data whose generation is less likely) in a data set, as "statistical outlier" and identifying the data as being abnormal (unfair). The above-referenced system, in particular, is characterized in that for each data in a data set, a score indicating how much the data falls outside is calculated.

The above-described conventional techniques, however, have the following problems.

First, although the conventional systems based on supervised learning are characterized in that features of unfairness and abnormality can be presented, it is in practice so difficult to prepare sufficient labeled data in advance as described above that highly precise learning can not be conducted to deteriorate efficiency of unfairness detection.

Secondly, although the conventional systems based on unsupervised learning are characterized in being capable of coping with unknown abnormality and unfairness, they have a problem that the reason why detected abnormal data is determined to be abnormal is not indicated.

Moreover, when structural abnormality occurs or when unfairness is made organizationally, abnormal data will be generated in the lump and in such a case, conventional unsupervised-learning-based systems fail to detect the abnormality.

Here, even when abnormal data is generated in the lump, if the features of the generating abnormality can be implicitly seized and automatically ruled to detect abnormal data using the rules, efficiency of abnormal data detection can be drastically improved.

SUMMARY OF THE INVENTION

An object of the present invention is to solve the above-described shortcomings of the conventional techniques and provide an outliner determination rule generation device for automatically generating a rule which characterizes abnormal data based on data (unlabeled data) which is not known to be abnormal (unfair) or not, an outlier detection device for detecting abnormal data efficiently using the rule obtained by the function of the outlier determination rule generation device, and an outlier determination rule generation method and an outlier detection method thereof.

According to the first aspect of the invention, an outlier rule generation device for generating a rule characterizing abnormal data in a data set, comprises means for calculating a degree of outlier indicative of a degree of being abnormal and sampling data based on the degree of outlier to apply a label indicating whether data is abnormal data or not to the sampled data, and generating a rule characterizing abnormal data by supervised learning based on a set of the respective labeled data.

In the preferred construction, the outlier rule generation device may comprise a degree of outlier calculation unit for calculating a degree of outlier indicative of a degree of being abnormal with respect to each data in the data set, a sampling unit for sampling each the data based on the degree of outlier calculated to apply a label indicating whether data is abnormal data or not to the sampled data, and a supervised learning unit for generating a rule characterizing abnormal data by supervised learning based on a set of the respective data to which the label is applied.

According to the second aspect of the invention, an outlier detection device for detecting abnormal data in a data set, comprises means for holding a set of rules characterizing abnormal data, determining whether each data of the data set is abnormal data or not based on the held rules, calculating a degree of outlier indicative of a degree of being abnormal with respect to each data determined not to be abnormal data, sampling the data based on the degree of outlier calculated, generating a new rule characterizing abnormal data by supervised learning based on a set of the respective data to which a label indicating whether data is abnormal data or not is applied and adding the new rule to the held set of rules to update the rules.

In the preferred construction, the outlier detection device may comprise an outlier rule preservation unit for holding the set of rules characterizing abnormal data, a filtering unit for determining whether each data of the data set is abnormal data or not based on the held rules, a degree of outlier calculation unit for calculating a degree of outlier indicative of a degree of being abnormal with respect to each data determined not to be abnormal data by the filtering unit, a sampling unit for sampling each data whose degree of outlier is calculated by the degree of outlier calculation unit based on the degree of outlier calculated to apply a label indicating whether data is abnormal data or not to the sampled data, and a supervised learning unit for generating a new rule characterizing abnormal data by supervised learning based on a set of the respective data to which the label is applied and adding the new rule to the held set of rules to update the rules.

In another preferred construction, after repeatedly executing a predetermined number of times a series of processing of making determination of abnormal data in the data set based on the held rules, generating a new rule characterizing abnormal data based on each the data determined not to be abnormal and updating the held rules, determination is made whether each data of the data set is abnormal data or not based on the held rules to output the determination result.

In another preferred construction, a series of processing of making determination of abnormal data in the data set based on the held rules, outputting data determined to be abnormal, generating a new rule characterizing abnormal data based on each the data determined not to be abnormal and updating the held rules is repeatedly executed a predetermined number of times with respect only to data determined not to be abnormal in preceding processing.

In another preferred construction, a sequentially applied data string is the set of data from which abnormal data is detected.

In another preferred construction, the filtering unit determines whether the sequentially applied data string to be examined is abnormal data or not based on the held rules, the degree of outlier calculation unit calculates a degree of outlier indicative of a degree of being abnormal with respect to each data determined not to be abnormal data by the filtering unit, the sampling unit accumulates data whose degree of outlier is calculated by the degree of outlier calculation unit and when the data is accumulated in a volume of more than a predetermined value, samples the data based on the degree of outlier calculated and applies a label indicating whether data is abnormal data or not to the sampled data, and the supervised learning unit generates a new rule characterizing abnormal data by supervised learning based on a set of the respective data to which the label is applied and adds the new rule to the held set of rules to update the rules.

In another preferred construction, the outlier detection device may comprise an outlier rule editing unit for editing the held rules by user's operation.

According to the third aspect of the invention, an outlier rule generation method of generating a rule characterizing abnormal data in a data set, comprising a supervised learning step of calculating a degree of outlier indicative of a degree of being abnormal and sampling data based on the degree of outlier to apply a label indicating whether data is abnormal data or not to the sampled data, and generating a rule characterizing abnormal data by supervised learning based on a set of the respective labeled data.

In the preferred construction, the outlier rule generation method may comprise a degree of outlier calculation step of calculating a degree of outlier indicative of a degree of being abnormal with respect to each data in the data set, a sampling step of sampling each the data based on the degree of outlier calculated to apply a label indicating whether the data is abnormal data or not to the sampled data, and a supervised learning step of generating a rule characterizing abnormal data by supervised learning based on a set of the respective data to which the label is applied.

According to another aspect of the invention, an outlier detection method of detecting abnormal data in a data set, comprises a supervised learning step of holding a set of rules characterizing abnormal data, determining whether each data of the data set is abnormal data or not based on the held rules, calculating a degree of outlier indicative of a degree of being abnormal with respect to each data determined not to be abnormal data, sampling the data based on the degree of outlier calculated, generating a new rule characterizing abnormal data by supervised learning based on a set of the respective data to which a label indicating whether data is abnormal data or not is applied and adding the new rule to the held set of rules to update the rules.

In the preferred construction, the outlier detection method may comprise an outlier rule preservation step of holding the set of rules characterizing abnormal data, a filtering step of determining whether each data of the data set is abnormal data or not based on the held rules, a degree of outlier calculation step of calculating a degree of outlier indicative of a degree of being abnormal with respect to each data determined not to be abnormal data by the filtering step, a sampling step of sampling each data whose degree of outlier is calculated by the degree of outlier calculation step based on the degree of outlier calculated to apply a label indicating whether data is abnormal data or not to the sampled data, and a supervised learning step of generating a new rule characterizing abnormal data by supervised learning based on a set of the respective data to which the label is applied and adding the new rule to the held set of rules to update the rules.

In another preferred construction, after repeatedly executing a predetermined number of times a series of processing of making determination of abnormal data in the data set based on the held rules, generating a new rule characterizing abnormal data based on each the data determined not to be abnormal and updating the held rules, determination is made whether each data of the data set is abnormal data or not based on the held rules to output the determination result.

In another preferred construction, a series of processing of making determination of abnormal data in the data set based on the held rules, outputting data determined to be abnormal, generating a new rule characterizing abnormal data based on each the data determined not to be abnormal and updating the held rules is repeatedly executed a predetermined number of times with respect only to data determined not to be abnormal in preceding processing.

In another preferred construction, a sequentially applied data string is the set of data from which abnormal data is detected.

In another preferred construction, at the filtering step, determination is made whether the sequentially applied data string to be examined is abnormal data or not based on the held rules, at the degree of outlier calculation step, a degree of outlier indicative of a degree of being abnormal is calculated with respect to each data determined not to be abnormal data by the filtering step, at the sampling step, the data whose degree of outlier is calculated is accumulated and when the data is accumulated in a volume of more than a predetermined value, the data is sampled based on the degree of outlier calculated to apply a label indicating whether data is abnormal data or not to the sampled data, and at the supervised learning step, a new rule characterizing abnormal data is generated by supervised learning based on a set of the respective data to which the label is applied and the new rule is added to the held set of rules to update the rules.

In another preferred construction, the outlier detection method may comprise an outlier rule editing step of editing the held rules by user's operation.

According to a further aspect of the invention, an outlier rule generation program for generating a rule characterizing abnormal data in a data set by controlling a computer, wherein a supervised learning function is executed of calculating a degree of outlier indicative of a degree of being abnormal and sampling data based on the degree of outlier to generate a rule characterizing abnormal data by supervised learning based on a set of the respective data to which a label indicating whether data is abnormal data or not is applied.

According to a still further aspect of the invention, an outlier detection program for detecting abnormal data in a data set by controlling a computer, wherein a supervised learning function is executed of holding a set of rules characterizing abnormal data, determining whether each data of the data set is abnormal data or not based on the held rules, calculating a degree of outlier indicative of a degree of being abnormal with respect to each data determined not to be abnormal data, sampling the data based on the degree of outlier calculated, generating a new rule characterizing abnormal data by supervised learning based on a set of the respective data to which a label indicating whether data is abnormal data or not is applied and adding the new rule to the held set of rules to update the rules.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

In the following description, one data in a data set is represented as $x=(x_1, x_2, \ldots, x_d) \in D = X_1 \times \ldots X_d$. D is referred to as a domain. Each $x_i (i=1, 2, \ldots, d)$ is assumed, for example, to be a continuous value or a discrete value of a text etc. A set U of the data, that is, $U=\{x_1, x_2, \ldots, x_n\}$, is referred to as a data set.

Figure 1:
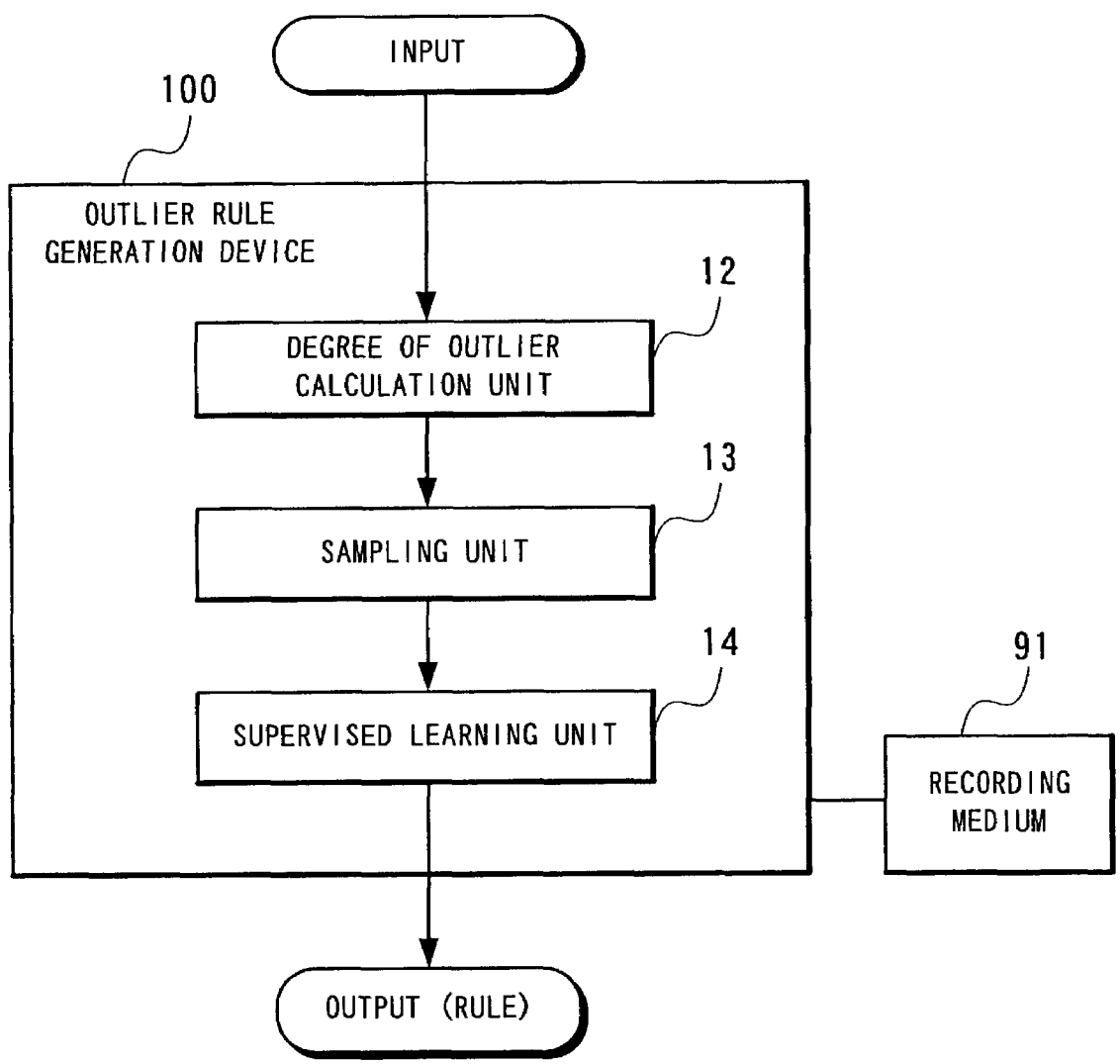
FIG. 1 is a block diagram showing a structure of an outlier rule generation device according to a first embodiment of the present invention.

FIG. 1 is a block diagram showing an outlier rule generation device 100 according to a first embodiment of the present invention. The outlier rule generation device 100 of the present embodiment is a device for generating, for a data set applied, a rule characterizing abnormal data within the data set. Rules generated here can be used in other device for detecting abnormality of data in order to detect abnormal data in a data set or to examine a tendency of abnormal data or for other purpose.

With reference to FIG. 1, the outlier rule generation device 100 of the present embodiment includes a degree of outlier calculation unit 12 for calculating, with respect to each data in a data set to be examined, a degree of outlier indicative of a degree of abnormality of the data, a sampling unit 13 for sampling each data based on a calculated degree of outliner to apply to each data a label indicating whether it is abnormal data or not, and a supervised learning unit 14 for generating a rule characterizing abnormal data by supervised learning based on a set of labeled data.

The degree of outlier calculation unit 12 calculates and outputs a degree of outliner indicative of a degree of unfairness (abnormality) of each data. More specifically, while sequentially reading data from a data set, the degree of outlier calculation unit 12 calculates a degree $s_t$ of outlier of each data $x_t$ and outputs the degree as $V=\{y_1, y_2, \ldots, y_n\}$ $(y_t=x_t, s_t))$.

Next, the sampling unit 13 will be described. Based on a degree of outlier of each data output by the degree of outlier calculation unit 12, the sampling unit 13 applies to each data a label indicating whether the data is abnormal (unfair) or not to generate a set of data with supervisor information. More specifically, the sampling unit 13 generates a data set with supervisor information from a scored (whose degree of outlier is calculated) data set $V=\{y_1, y_2, \ldots, y_n\}$ and at that time, data whose score is high (having high degree of unfairness) is labeled "positive" and data whose score is not high is labeled "negative".

Specific example of labeling processing conducted by the sampling unit 13 will be shown in the following. First, take out q % higher score data from the data set $V=\{y_1, y_2, \ldots, y_n\}$ to attach the label "positive" to the data and conduct random sampling of data which is not included in the q % higher score data to take out k*q % of the whole data (k: positive number, e.g. k=3) and attach the label "negative" to the taken out data. Newly generated data is written as $z_i=(x_{t(i)}, 1_{t(i)})$, in which $1_t$ denotes a label and t(i) denotes a one-to-one function from an integer i ($1 \leq i \leq m \leq n$) to $\{1, 2, \ldots n\}$. New data set obtained here is expressed as $W=\{z_1, z_2, \ldots, z_m\}$.

Another possible method, not a method of taking out "q % higher score data", is, for example, labeling data having a higher score than a provided certain threshold value as "positive" and taking out data whose score is lower than the threshold value by random sampling to label the data as "negative".

Next, the supervised learning unit 14 will be described. The supervised learning unit 14 generates a rule from data with supervisor information output by the sampling unit 13. Here, supervised learning (processing that the supervised learning unit 14 executes) represents outputting a function $f:D \rightarrow \{positive, negative\}$ with a data set with supervisor information $W=\{z_1, z_2, \ldots, z_m\}$ as input or represents outputting a conditional probability distribution f of $1 \in \{positive, negative\}$ with a data set with supervisor information $W=\{z_1, z_2, \ldots, z_m\}$ as input when data x is applied. Here, W is referred to as training data.

Consideration will be here given to a case, for example, where with $x_1$ representing data indicative of a height (cm), with respect to data in W, data having $x_1 \geq 300$ in W is labeled positive because it is highly probable that it is unfair and the remaining data is labeled negative. In this case, to the input of W, a function f should be output which indicates that If $x_1 \geq 300$, then positive is required.

In practice, because regularity hidden in training data is more complicated or because a data set contains noise, learning is not that simple. Various manners have been proposed for conducting learning efficiently under such complicated conditions. According to these manners, a method of representing a rule varies such as a method using such a logical expression as described above or a method using a neural network. The learning system using a probability decision list which is proposed by K. Yamanishi (K. Yamanishi, "A Learning Criterion for Stochastic Rules", Machine Learning, vol. 9, pp. 165-203, 1992), for example, employs the following expressions:

If $x_1 \geq 300$, then positive with probability 0.9,

Else if $x_2$=male, then positive with probability 0.8,

Else negative with probability 0.2.

Such representation system, which is referred to as a probability decision list, specifies a conditional probability distribution.

In the following, making determination whether applied data $x \in D$ is positive or negative will be referred to as "filtering" (filtering of data x). When the corresponding $f:D \ni x \rightarrow \{positive, negative\}$ is a function whose value is unitarily determined, the function f itself can be used for filtering and when f is a conditional probability distribution, the following determination criterion is used:

If $f(positive|x) \geq p_{th}$, then x is positive.

Here, $p_{th}$, which denotes a threshold value given by a user, is ordinarily designated to be 0.5.

Figure 2:
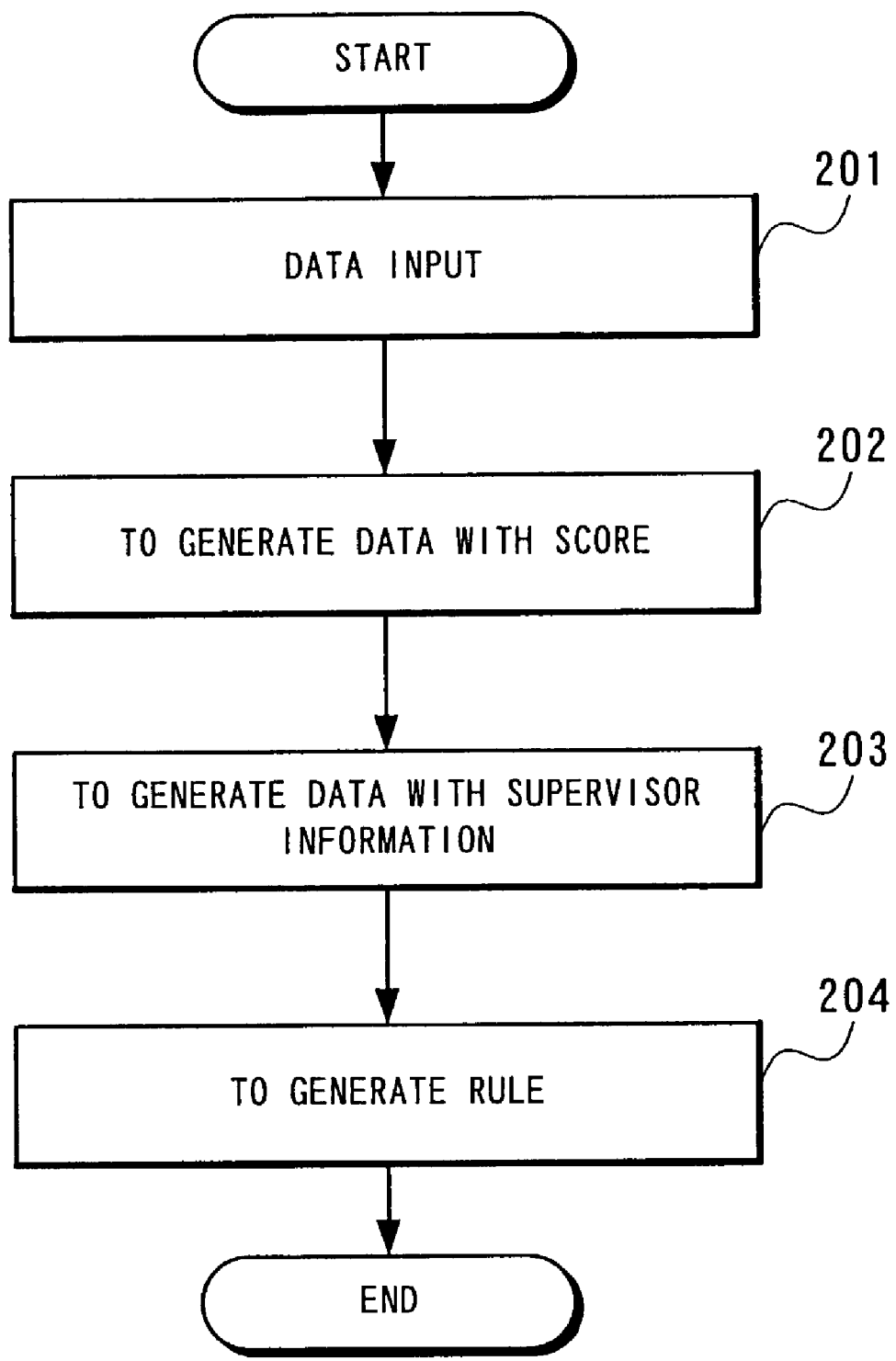
FIG. 2 is a flow chart for use in explaining operation of outlier rule generation in the first embodiment of the present invention.

FIG. 2 is a flow chart for use in explaining operation of outlier rule generation according to the present embodiment. With reference to FIG. 2, the outlier rule generation device 100 of the present embodiment operates in the following order.

First, transfer an input $U=\{x_1, x_2, \ldots, x_n\}$ to the degree of outlier calculation unit 12 (Step 201).

The degree of outlier calculation unit 12 calculates, for each data $x_t$ of the input, a score $s_t$ of a degree of outlier indicative of a degree of unfairness (abnormality) of each data to generate data with score $V=\{y_1, y_2, \ldots, y_n\}$ and output the same to the sampling unit 13 (Step 202).

The sampling unit 13 takes out higher score data at a predetermined rate from the data V with scores and applies a label of positive to the data to make the same positive data. Furthermore, the unit 13 takes out a predetermined number of data starting with the lowest score data from V by random sampling and applies a label of negative to the data to make the same negative data. By thus applying positive and negative labels to the data, data $W=\{z_1, z_2, \ldots, z_m\}$ with supervisor information is generated and applied to the supervised learning unit 14 (Step 203).

The supervised learning unit 14 obtains and outputs a rule characterizing abnormal data based on the applied data W with supervisor information (Step 204).

As described in the foregoing, according to the outlier rule generation device 100 of the present embodiment, a rule characterizing abnormal data can be automatically generated with high efficiency based on data (unsupervised data) which is not known to be abnormal (unfair) or not.

Figure 3:
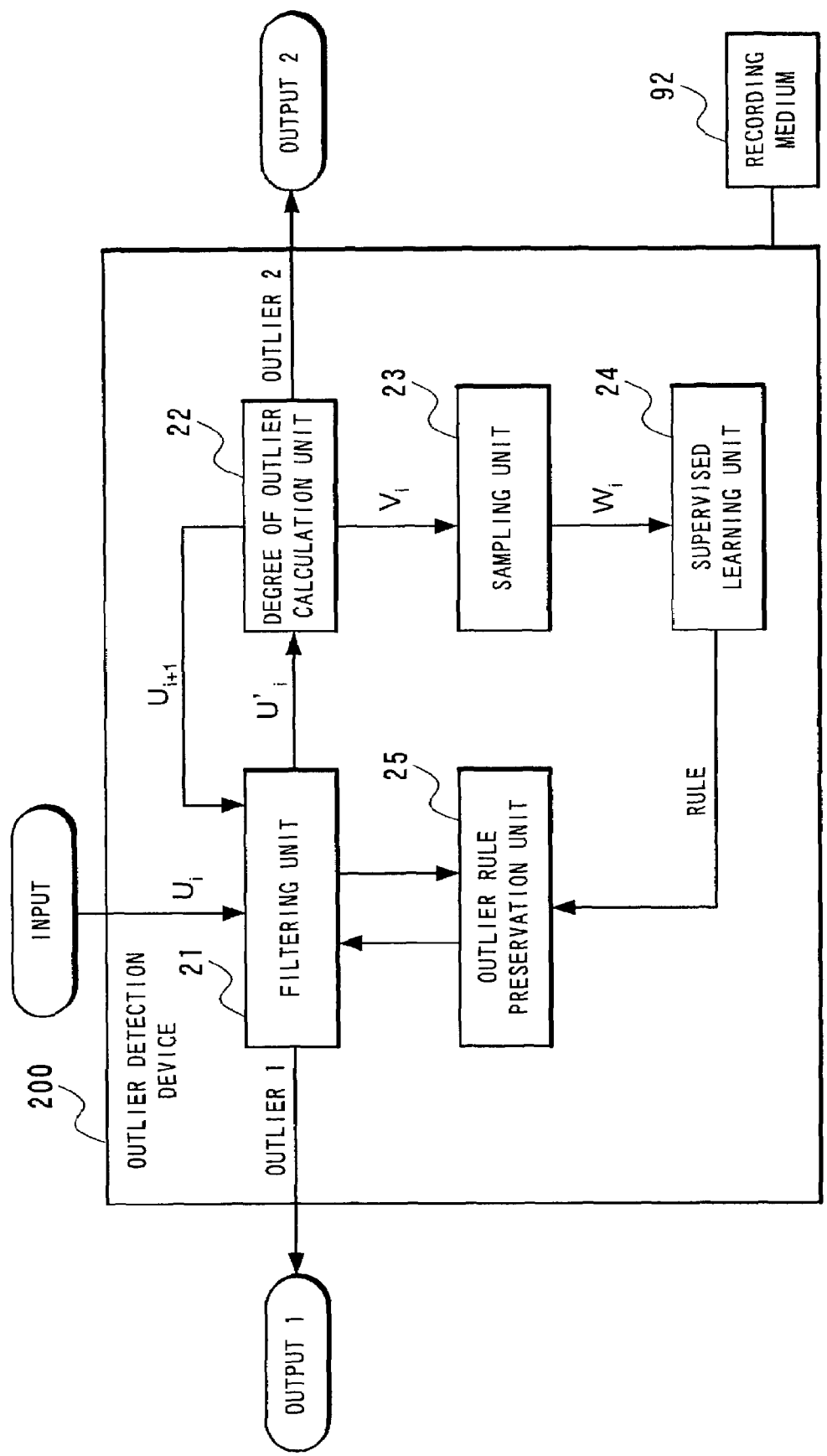
FIG. 3 is a block diagram showing a structure of an outlier detection device according to a second embodiment of the present invention.

FIG. 3 is a diagram showing a structure of an outlier detection device 200 according to a second embodiment of the present invention. The outlier detection device 200 of the present embodiment is a device for detecting abnormal data in a data set. The outlier detection device 200 of the present embodiment is characterized in having the function of the outlier rule generation device 100 described in the first embodiment to automatically generate a rule which characterizes abnormal data within an applied data set and execute detection of abnormal data based on the rule.

With reference to FIG. 3, the outlier detection device 200 of the present embodiment includes, in addition to a degree of outlier calculation unit 22, a sampling unit 23 and a supervised learning unit 24 provided as the components of the outlier rule generation device 100 of the first embodiment, an outlier rule preservation unit 25 for preserving a set of rules which characterize abnormal data and a filtering unit 21 for determining whether each data of an applied data set is abnormal data or not based on the preserved rules.

In the outlier detection device 200 of the present embodiment, the degree of outlier calculation unit 22 calculates a degree of outlier indicative of a degree of abnormality of each data which is determined not to be abnormal data by the filtering unit 21.

Then, the sampling unit 23 samples each data whose degree of outlier is calculated by the degree of outlier calculation unit 22 based on the calculated degree of outlier to apply to the sampled data a label indicating whether the data is abnormal or not.

Then, the supervised learning unit 24 generates a new rule which characterizes abnormal data by supervised learning based on a set of labeled data. Then, the unit 24 adds the newly generated rule to a set of rules characterizing abnormal data which are preserved in the outlier rule preservation unit 25 and stores the same.

As a result, the rules preserved in the outlier rule preservation unit 25 will be appropriately updated, and using the updated rules, abnormal data can be detected with higher precision.

This also enables the outlier detection device 200 of the present embodiment to realize highly efficient detection of abnormal data with high precision by, after, for example, repeatedly executing the above-described processing with respect to a data set to be examined a predetermined number of times to update the rules preserved in the outlier rule preservation unit 25 to those enabling abnormal data to be detected with high precision, the detection of abnormal data in the data set to be examined based on the rule by the filtering unit 21.

Figure 4:
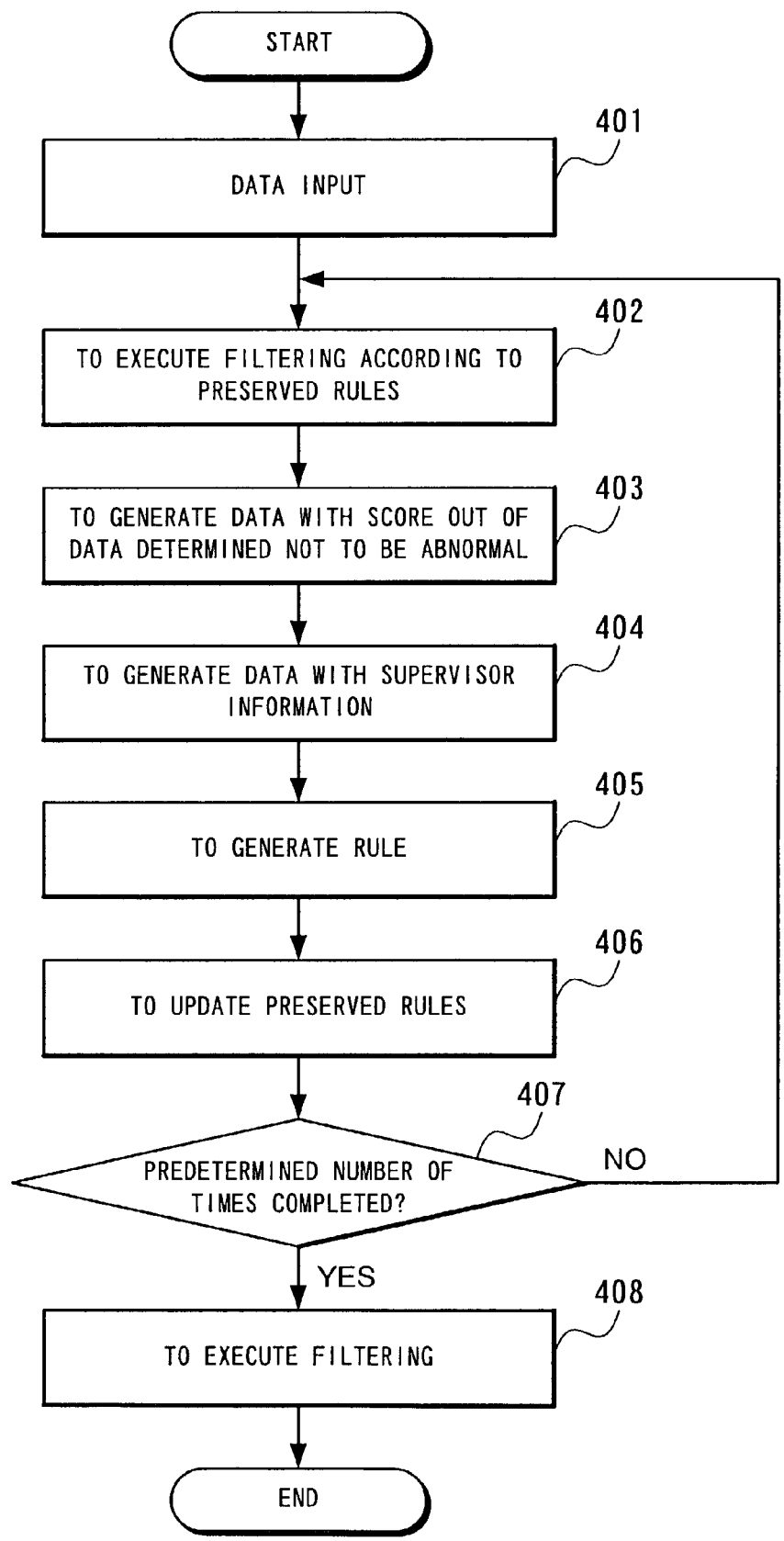
FIG. 4 is a flow chart for use in explaining operation of outlier detection in the second embodiment of the present invention.

Next, description will be made of operation of the outlier detection device 200 according to the present embodiment. FIG. 4 is a flow chart for use in explaining one embodiment of operation of the outlier detection according to the present embodiment.

With reference to FIG. 4, first, repeatedly execute the processing of Steps 402 to 406 with respect to a data set to be examined a predetermined number of times to repeatedly update rules preserved in the outlier rule preservation unit 25. More specifically, the outlier detection device 200 operates in the following order in an i-th iteration.

An input U is transferred to the filtering unit 21 by an external input or from the degree of outlier calculation unit 22 (Step 401). The filtering unit 21 makes determination of the input data based on a set $R_i$ of outlier rules accumulated in the outlier rule preservation unit 25 to output data determined to be an outlier as "outlier 1" and sends a data set U' determined not to be an outlier to the degree of outlier calculation unit 22 (Step 402).

The degree of outlier calculation unit 22 calculates a score $s_t$ for each data $x_t$ determined not to be an outlier by the filtering unit 21, generates a set $V_i$ of data with scores and applies the set to the sampling unit 23 (Step 403). At the same time, the unit 22 outputs data whose degree of outlier is not less than a predetermined threshold value as "outlier 2" and holds a set of-data determined to be otherwise as U".

The sampling unit 23 takes out higher score data at a predetermined rate from $V_i$ to take the same as positive data and takes out a predetermined number of data starting with the lowest score data from $V_i$ by random sampling to take the same as negative data, thereby generating data $W_i$ with supervisor information to apply the same to the supervised learning unit 24 (Step 404).

The supervised learning unit 24 obtains a group of rules characterizing abnormal data based on the applied data with supervisor information and selects or gives up a rule from the group by conforming to a predetermined criterion or by user's choice to send in the selected rule to the outlier rule preservation unit 25 (Step 405).

The outlier rule preservation unit 25 adds the sent-in rule to the set $R_i$ of rules to generate and preserve a new set $R_{i+1}$ of rules (Step 406).

By repeatedly executing the foregoing processing of Steps 402 to 406 a predetermined number of times in the outlier detection device 200, the rules preserved in the outlier rule preservation unit 25 are repeatedly updated to those enabling abnormal data to be detected with high precision (Step 407) and using the updated rules, final filtering is executed to detect abnormal data (Step 408).

Moreover, in a system which repeatedly executes the above-described series of rule generation and updating, it is also effective, for example, to exclude data whose abnormality is detected by the filtering unit 21 in the preceding processing from targets of the following processing. In this case, assuming that data whose abnormality is detected by the filtering unit 21 is output at a time point of detection of the abnormality each time, rule generation and updating processing and a series of following processing will be conducted based on the remaining data-from which abnormality is not detected so far.

Figure 5:
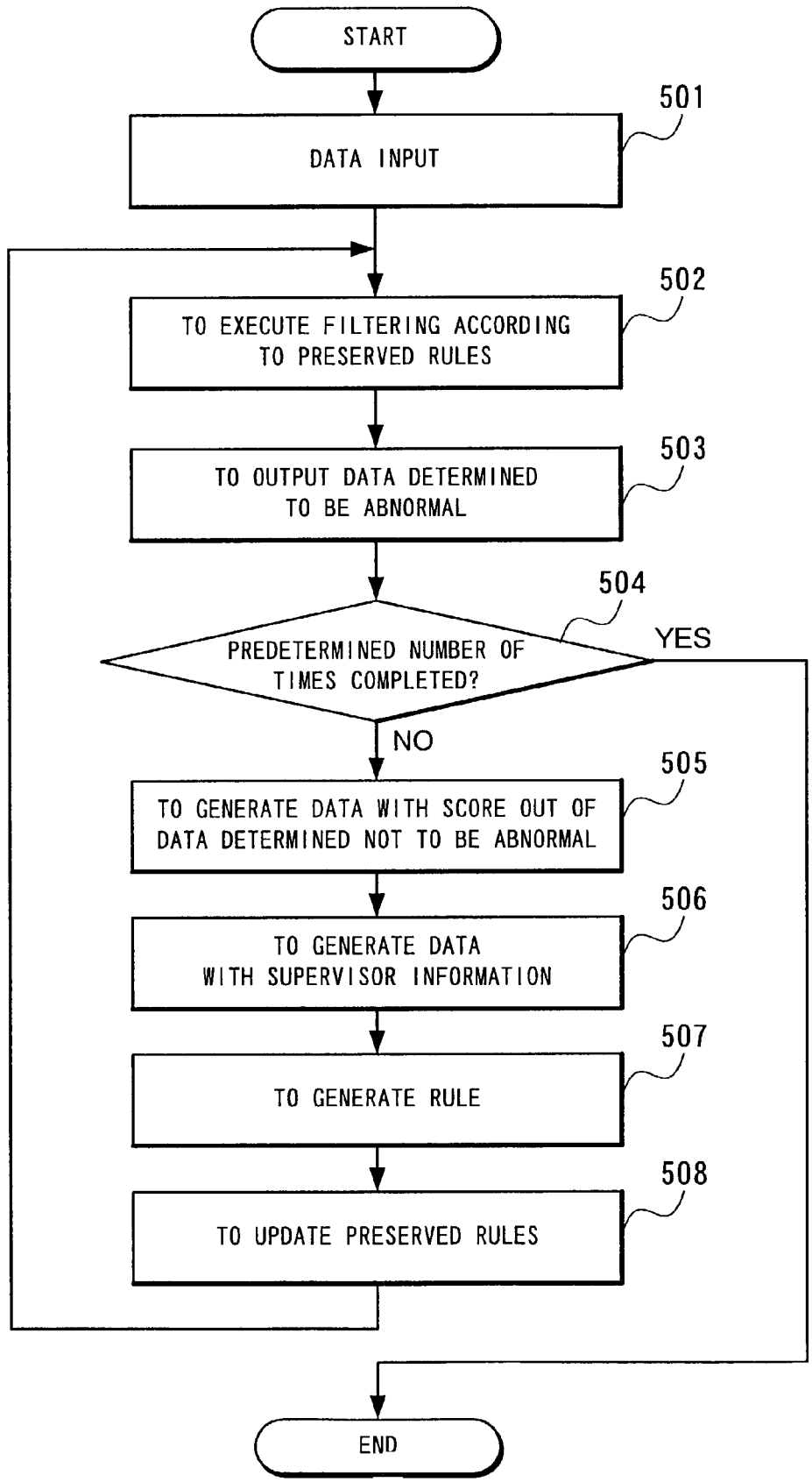
FIG. 5 is a flow chart for use in explaining operation as another embodiment of the outlier detection according to the second embodiment of the present invention.

FIG. 5 is a flow chart for use in explaining operation as the above-described embodiment of the outlier detection device 200 according to the present embodiment.

With reference to FIG. 5, first, repeatedly execute the processing of Steps 502 to 508 with respect to a data set to be examined a predetermined number of times. More specifically, the outlier detection device 200 operates in the following order in an i-th iteration.

An input $U_i$ is transferred to the filtering unit 21 by an external input or from the degree of outlier calculation unit 22 (Step 501). The filtering unit 21 makes determination of the input data based on a set $R_1$ of outlier rules accumulated in the outlier rule preservation unit 25 to output data determined to be an outlier as "outlier 1" and sends a data set $U_1'$ determined not to be an outlier to the degree of outlier calculation unit 22 (Steps 502 and 503).

Here, if the predetermined number of times of iteration is completed, end the processing and otherwise proceed to the processing at Step 505 and the following steps (Step 504).

The degree of outlier calculation unit 22 calculates a score $s_t$ for each data $x_t$ determined not to be an outlier by the filtering unit 21, generates a set $V_i$ of data with scores and applies the set to the sampling unit 23. At the same time, the unit 22 outputs data whose degree of outlier is not less than a predetermined threshold value as "outlier 2" and holds a set of data determined to be otherwise as $U_{i+1}$ (Step 505).

The sampling unit 23 takes out higher score data at a predetermined rate from $V_i$ to take the same as positive data and takes out a predetermined number of data starting with the lowest score data from $V_i$ by random sampling to take the same as negative data, thereby generating data $W_i$ with supervisor information to apply the same to the supervised learning unit 24 (Step 506).

The supervised learning unit 24 obtains a group of rules characterizing abnormal data based on the applied data with supervisor information and selects or gives up a rule among the group by conforming to a predetermined criterion or by user's choice to send in the selected rule to the outlier rule preservation unit 25 (Step 507).

The outlier rule preservation unit 25 adds the sent-in rule to the set $R_i$ of rules to generate and preserve a new set $R_{i+1}$ of rules (Step 508).

By repeatedly executing the foregoing processing of Steps 502 to 508 a predetermined number of times in the outlier detection device 200, abnormal data can be sequentially taken out and detected from the data $U_i$ to be processed and the preserved rules $R_i$ can be updated to better rules every time processing is repeated.

As described in the foregoing, according to the outlier detection device 200 of the present embodiment, rules characterizing abnormal data can be automatically generated based on data which is not known to be abnormal or not and using the automatically generated rules, abnormal data can be efficiently detected.

Figure 6:
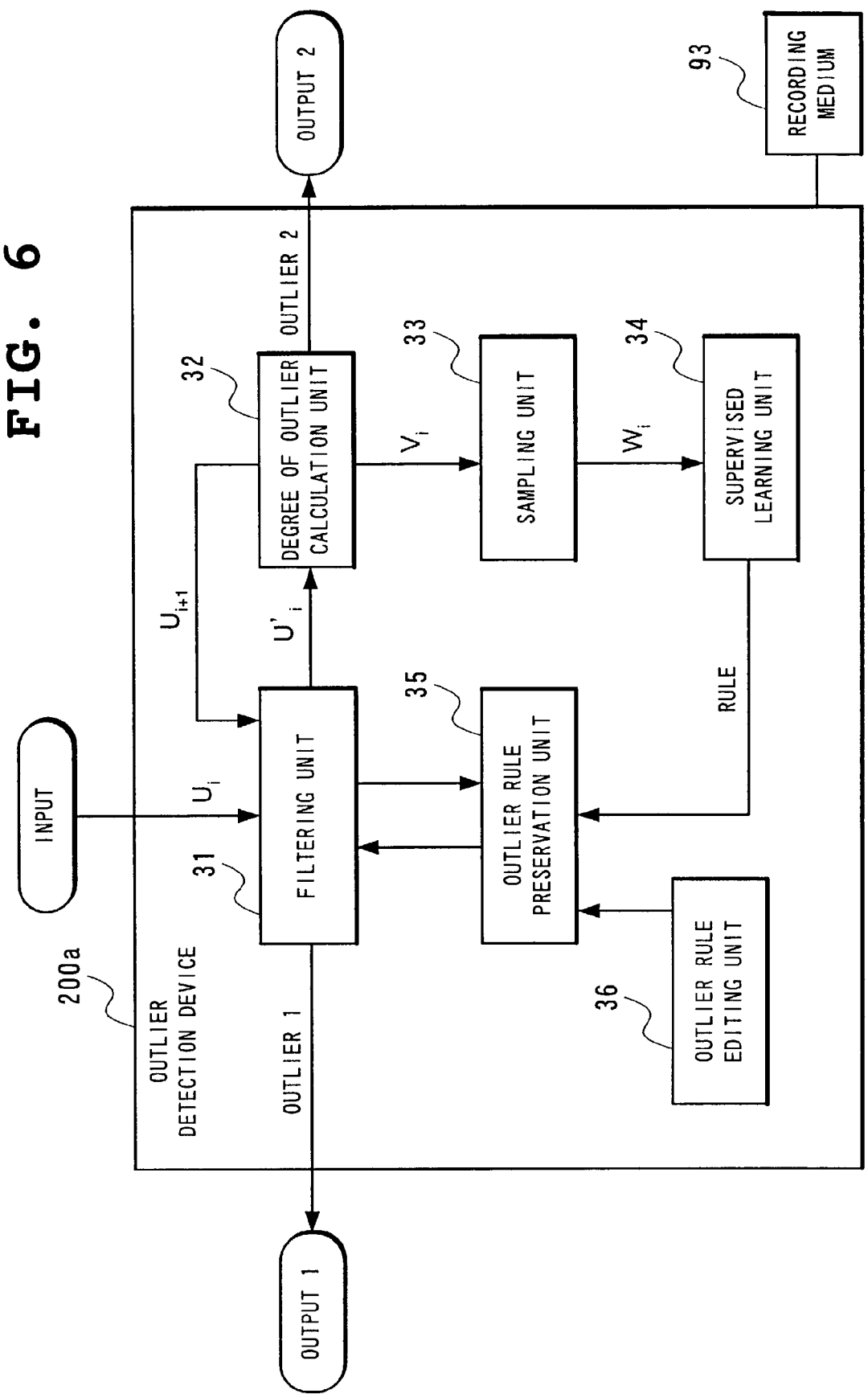
FIG. 6 is a block diagram showing a structure of an outlier detection device according to a third embodiment of the present invention.

FIG. 6 is a block diagram showing a structure of an outlier detection device 200a according to a third embodiment of the present invention. With reference to FIG. 6, the outlier detection device 200a of the present embodiment is further provided, in addition to the components of the outlier detection device 200 according to the second embodiment, with an outlier rule editing unit 36 for a user to operate to edit outlier rules preserved in an outlier rule preservation unit 35.

In the present embodiment, by using the outlier rule editing unit 36, users are allowed to freely edit the outlier rules preserved in the outlier rule preservation unit 35 as necessary.

Figure 7:
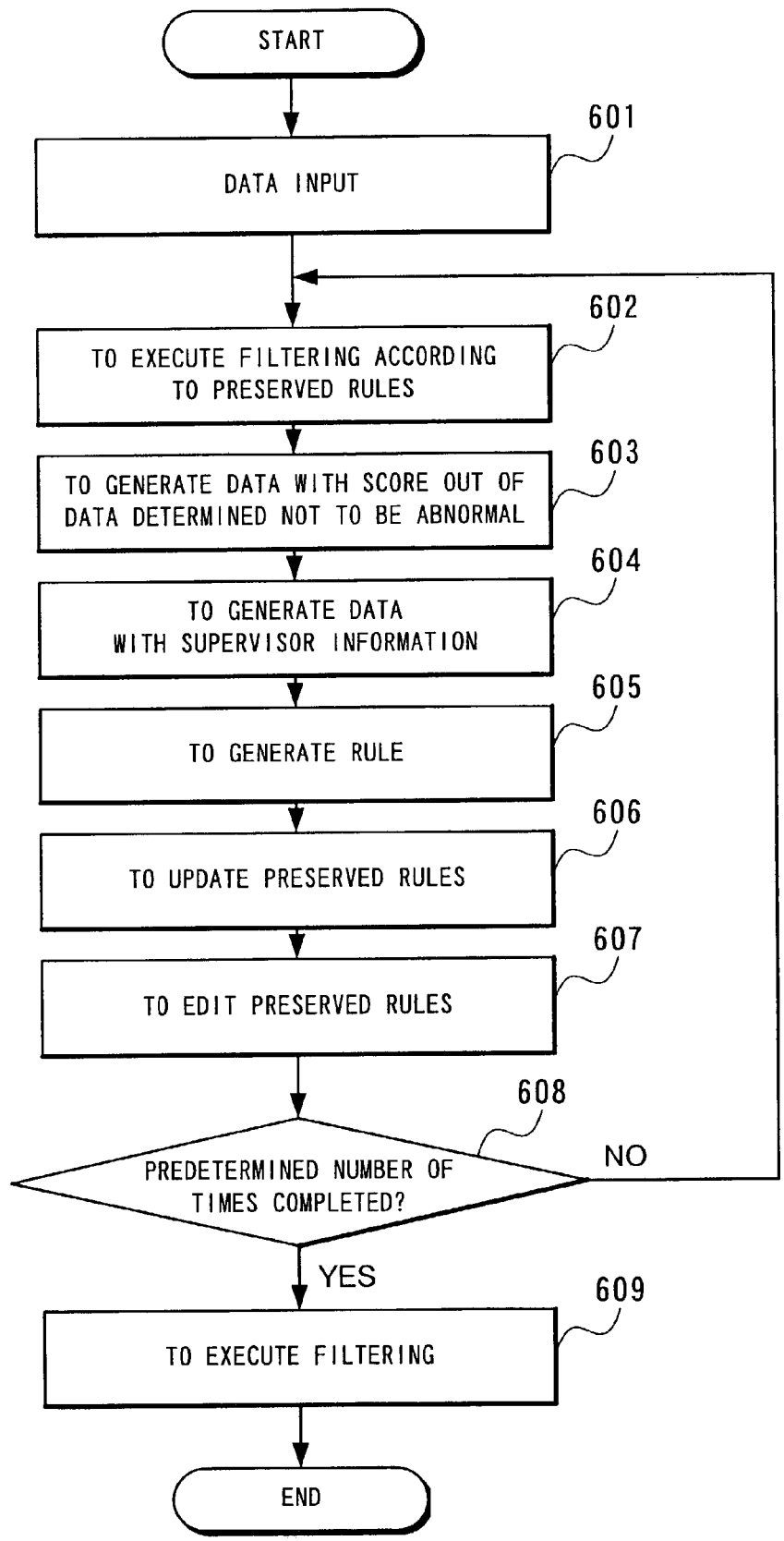
FIG. 7 is a flow chart for use in explaining operation of outlier detection in the third embodiment of the present invention.

Next, operation of the outlier detection device 200a of the present embodiment will be described. FIG. 7 is a flow chart for use in explaining one embodiment of operation of outlier detection according to the present embodiment.

With reference to FIG. 7, first, in the same way as the second embodiment, repeatedly execute the processing of Steps 602 to 607 with respect to a data set to be examined a predetermined number of times to repeatedly update the rules preserved in the outlier rule preservation unit 35. In other words, the outlier detection device 200a operates in the following order in an i-th iteration.

An input U is transferred to a filtering unit 31 by an external input or from a degree of outlier calculation unit 32 (Step 601). The filtering unit 31 makes determination of the input data based on a set $R_i$ of outlier rules accumulated in the outlier rule preservation unit 35 to output data determined to be an outlier as "outlier 1" and send a data set U' determined not to be an outlier to the degree of outlier calculation unit 32 (Step 602).

The degree of outlier calculation unit 32 calculates a score $s_t$ for each data $x_t$ determined not to be an outlier by the filtering unit 31, generates a set $V_i$ of data with scores and applies the set to a sampling unit 33 (Step 603). At the same time, the unit 32 outputs data whose degree of outlier is not less than a predetermined threshold value as "outlier 2" and holds a set of data determined to be otherwise as U".

The sampling unit 33 takes out higher score data at a predetermined rate from Vi to take the same as positive data and takes out a predetermined number of data starting with the lowest score data from $V_i$ by random sampling to take the same as negative data, thereby generating data $W_i$ with supervisor information to apply the same to a supervised learning unit 34 (Step 604).

The supervised learning unit 34 obtains a group of rules characterizing abnormal data based on the applied data with supervisor information and selects or gives up a rule from the group by conforming to a predetermined criterion or by user's choice to send in the selected rule to the outlier rule preservation unit 35 (Step 605).

The outlier rule preservation unit 35 adds the sent-in rule to the set $R_i$ of rules to generate and preserve a new set $R_{i+1}$ of rules (Step 606). In addition, when necessary, the user is allowed to edit the outlier rules preserved in the outlier rule preservation unit 35 by using the outer rule editing unit 36 (Step 607).

By repeatedly executing the foregoing processing of Steps 602 to 607 a predetermined number of times in the outlier detection device 200a, the rules preserved in the outlier rule preservation unit 35 can be repeatedly updated to those enabling detection of abnormal data with higher precision (Step 608). Then, using the updated (or further edited by the user) rules, execute final filtering to detect abnormal data (Step 609).

Although in the embodiment shown in FIG. 7 here, it is assumed that the processing conducted by a user to edit rules is Step 607 which is the final step of the repetitional processing of Steps 602 to 607, processing of outlier detection according to the present embodiment is not limited thereto. It is similarly possible, for example, to execute the processing conducted by a user to edit the rules at the end of the repetitional processing of Steps 602 to 607 or between Steps 605 and 606 in the loop of the repetitional processing.

It is also effective in the system where the above-described series of processing of rule generation and updating, for example, to exclude data whose abnormality is detected by the filtering unit 21 in the preceding processing from targets of following processing. In this case, assuming that data whose abnormality is detected by the filtering unit 21 is output at the time of detection of the abnormality each time, using the remaining data whose abnormality is not detected so far, the processing of rule generation and updating and a series of processing to follow will be executed.

Figure 8:
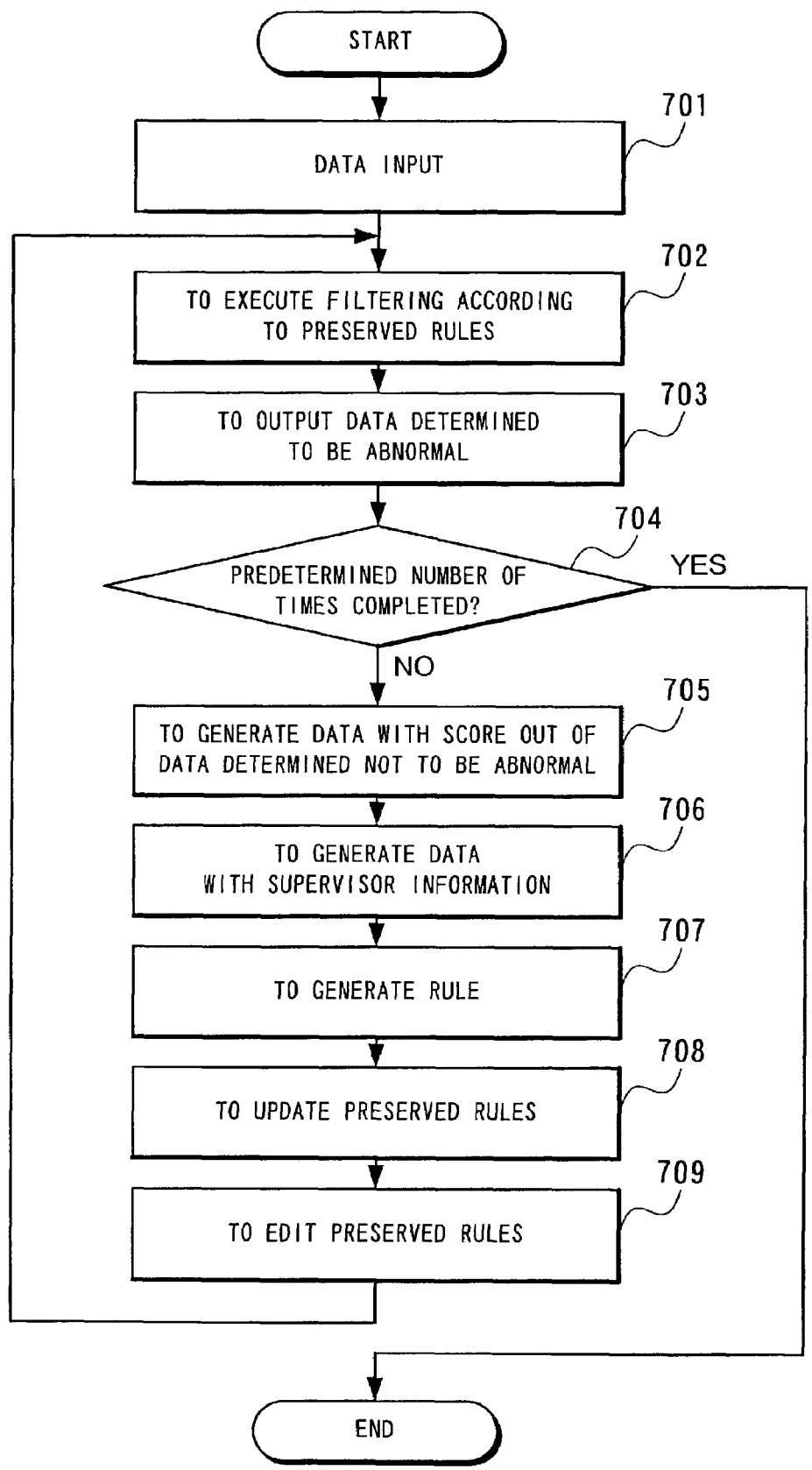
FIG. 8 is a flow chart for use in explaining operation as another embodiment of the outlier detection according to the third embodiment of the present invention.

FIG. 8 is a flow chart for use in explaining operation as the above-described embodiment of the outlier detection device 200a according to the present embodiment.

With reference to FIG. 8, first, repeatedly execute the processing of Steps 702 to 708 with respect to a data set to be examined a predetermined number of times. More specifically, the outlier detection device 200a operates in the following order in an i-th iteration.

An input $U_i$ is transferred to the filtering unit 31 by an external input or from the degree of outlier calculation unit 32 (Step 701). The filtering unit 31 makes determination of the input data based on a set $R_i$ of outlier rules accumulated in the outlier rule preservation unit 35 to output data determined to be an outlier as "outlier 1" and send a data set $U_1'$ determined not to be an outlier to the degree of outlier calculation unit 32 (Steps 702 and 703).

Here, if the predetermined number of iteration is completed, end the processing and otherwise proceed to the processing at Step 705 and the following steps (Step 704).

The degree of outlier calculation unit 32 calculates a score $s_t$ for each data $x_t$ determined not to be an outlier by the filtering unit 31, generates a set $V_i$ of data with scores and applies the set to the sampling unit 33. At the same time, the unit 32 outputs data whose degree of outlier is not less than a predetermined threshold value as "outlier 2" and holds a set of data determined to be otherwise as $U_{i+1}$ (Step 705).

The sampling unit 33 takes out higher score data at a predetermined rate from $V_i$ to take the same as positive data and takes out a predetermined number of data starting with the lowest score data from $V_i$ by random sampling to take the same as negative data, thereby generating data $W_i$ with supervisor information to apply the same to the supervised learning unit 34 (Step 706).

The supervised learning unit 34 obtains a group of rules characterizing abnormal data based on the applied data with supervisor information and selects or gives up a rule from the group by conforming to a predetermined criterion or by user's choice to send in the selected rule to the outlier rule preservation unit 35 (Step 707).

The outlier rule preservation unit 35 adds the sent-in rule to the set $R_i$ of rules to generate and preserve a new set $R_{i+1}$ of rules (Step 708). When necessary, the user is allowed to edit the outlier rules preserved in the outlier rule preservation unit 35 by using the outlier rule editing unit 36 (Step 709).

By repeatedly executing the foregoing processing of Steps 702 to 709 a predetermined number of times in the outlier detection device 200a, abnormal data can be sequentially taken out and detected from the data $U_i$ to be processed and the preserved rules $R_i$ can be updated to better rules every time the processing is repeated.

Although in the embodiment shown in FIG. 8 here, it is assumed that the processing conducted by a user to edit the rules is the final Step 709 of the repetitional processing of Steps 702 to 709, processing of outlier detection according to the present embodiment is not limited thereto.

As described in the foregoing, the present embodiment has an effect, in addition to that attained by the second embodiment, of allowing a user to freely edit rules preserved in the outlier rule preservation unit 35, so that it is possible, for example, to modify inappropriate rules which are automatically determined or designate appropriate rules by a user.

Figure 9:
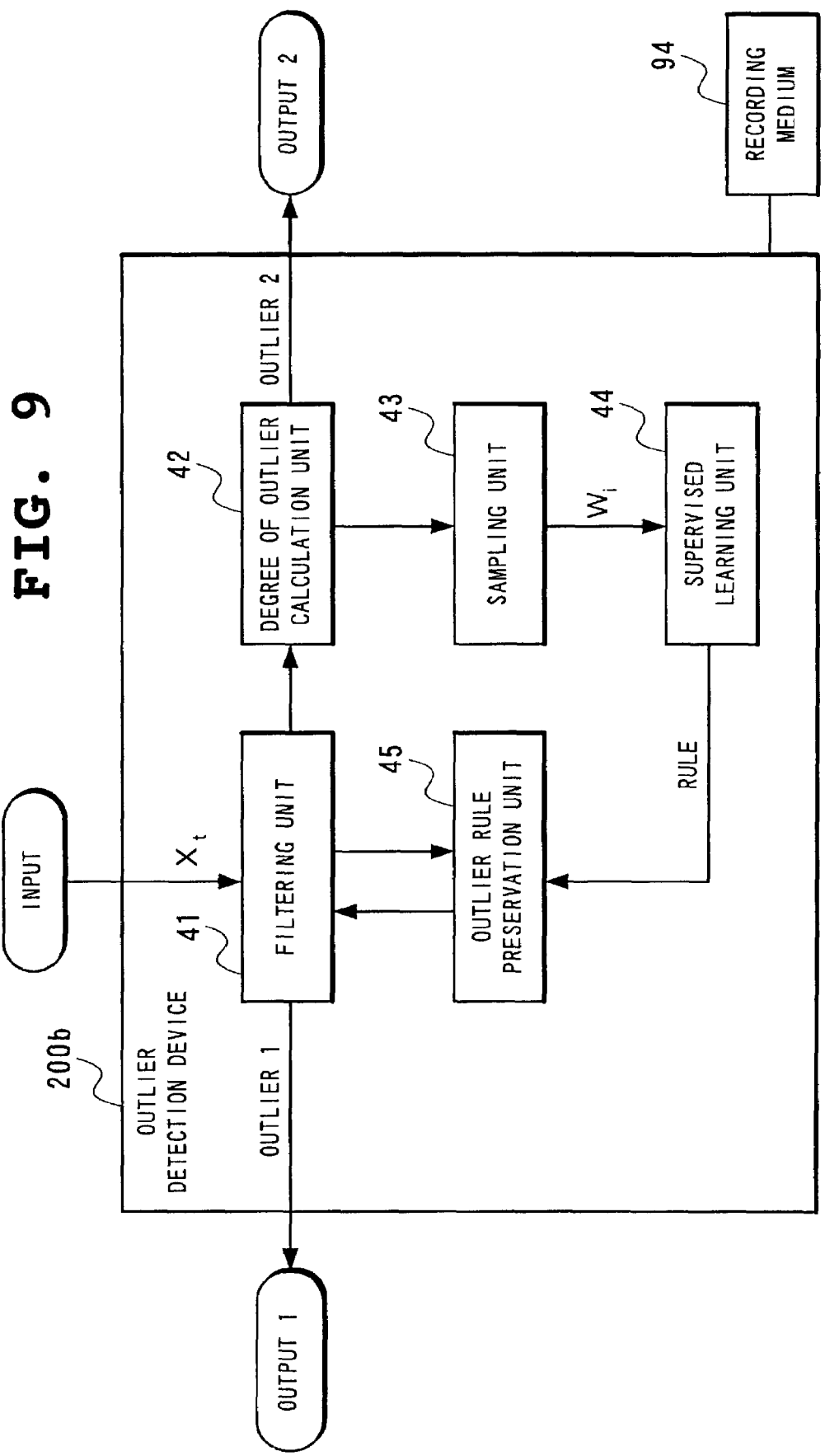
FIG. 9 is a block diagram showing a structure of an outlier detection device according to a fourth embodiment of the present invention.

FIG. 9 is a block diagram showing a structure of an outlier detection device 200b according to a fourth embodiment of the present invention. While in the second and third embodiments, the outlier detection devices are designed to receive input of all the data sets to be examined to detect abnormal data, the device according to the present embodiment is designed, with sequentially applied data as a target of examination, to sequentially accept input of the data to detect abnormal data. In addition, the outlier detection device 200b of the present embodiment executes abnormal data detection processing, while determining and updating rules for detecting abnormal data.

Figure 10:
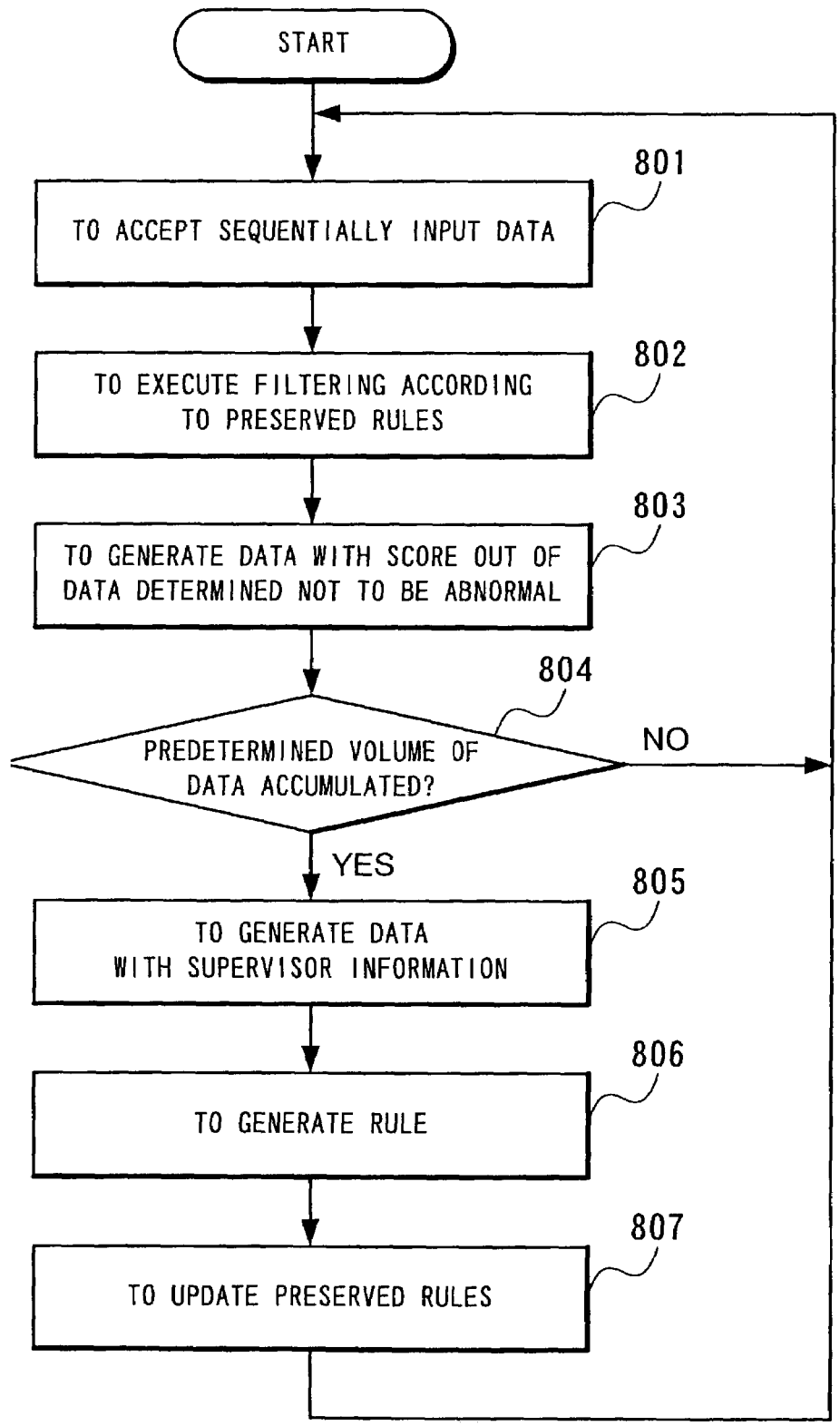
FIG. 10 is a flow chart for use in explaining operation of outlier detection in the fourth embodiment of the present invention.

FIG. 10 is a flow chart for use in explaining operation of outlier detection according to the present embodiment. Function of each component of the outlier detection device 200b according to the present embodiment is the same as that of the outlier detection device 200 according to the first embodiment with the only difference being that sequentially applied data is a target of examination, in which the following operation is conducted every time one data is applied.

Here, description will be given to a case where t-th data $x_t$ is transferred to a filtering unit 41 (Step 801). More specifically, when the t-th data $V_{xt}$ is transferred to the filtering unit 41, the filtering unit 41 make determination of the applied data based on a set $R_i$ of outlier rules accumulated in an outlier rule preservation unit 45 and when determining that the data is an outlier, outputs the same as "outlier 1" and when determining that the data is not an outlier, sends the same to a degree of outlier calculation unit 42 (Step 802).

The degree of outlier calculation unit 42 calculates a score $s_t$ for the applied data $x_t$, generates data $y_t$ with a score and applies the same to a sampling unit 43 (Step 803). At the same time, when the score is not less than a predetermined threshold value, the unit 42 outputs the data $x_t$ as "outlier 2".

The sampling unit 43 preserves the applied data and when the number of the preserved data reaches a predetermined number, takes high score data at a predetermined rate from the set of these data to take the same as positive data and further takes a predetermined number of data starting with the lowest score data by random sampling to take the same as negative data, thereby generating data $W_i$ with supervisor information and applying the generated data to a supervised learning unit 44 to erase all the accumulated data (Steps 804 and 805).

When receiving input of the labeled data $W_i$, the supervised learning unit 44 obtains a group of rules characterizing abnormal data based on the received data and selects or gives up a rule from the group by conforming to a predetermined criterion or by user's choice to send in the selected rule to the outlier rule preservation unit 45 (Step 806). The outlier rule preservation unit 45 adds the sent-in rule to the set $R_i$ of rules to generate and preserve a new set $R_{i+1}$ of rules (Step 807).

As described in the foregoing, the outlier detection device 200b of the present embodiment enables rules characterizing abnormal data to be automatically generated and sequentially and appropriately updated based on sequentially applied data which is not known to be abnormal or not, thereby efficiently detecting abnormal data from thereafter applied data by using the automatically generated latest rules.

Figure 11:
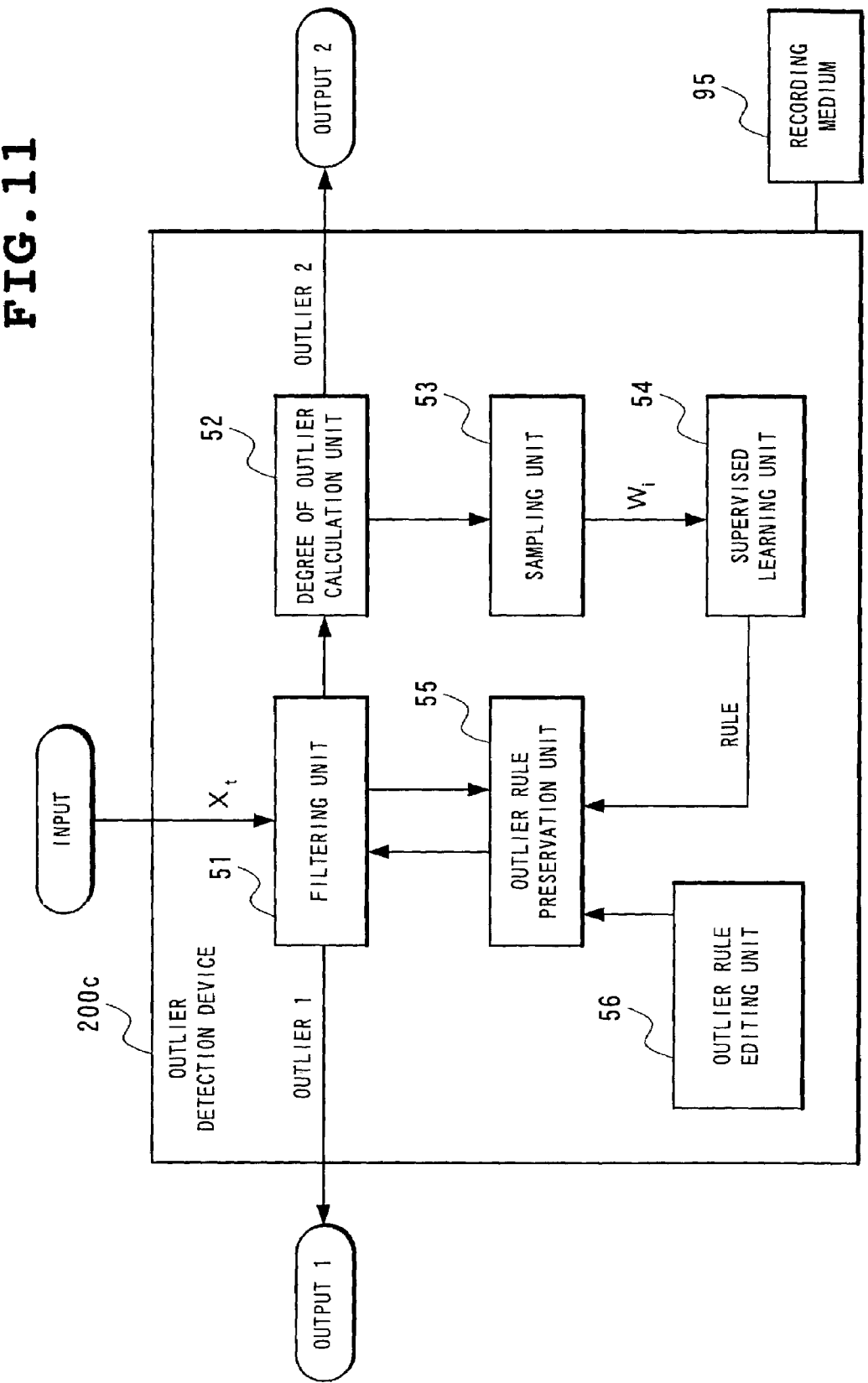
FIG. 11 is a block diagram showing a structure of an outlier detection device according to a fifth embodiment of the present invention.

FIG. 11 is a block diagram showing a structure of an outlier detection device 200c according to a fifth embodiment of the present invention. With reference to FIG. 11, the outlier detection device 200c of the present embodiment is further provided with, in addition to the components of the outlier detection device 200b of the fourth embodiment, an outlier rule editing unit 56 for a user to operate to edit outlier rules preserved in an outlier rule preservation unit 55.

In the present embodiment, by using the outlier rule editing unit 56, a user is allowed to freely edit the outlier rules preserved in the outlier rule preservation unit 55 as necessary.

Figure 12:
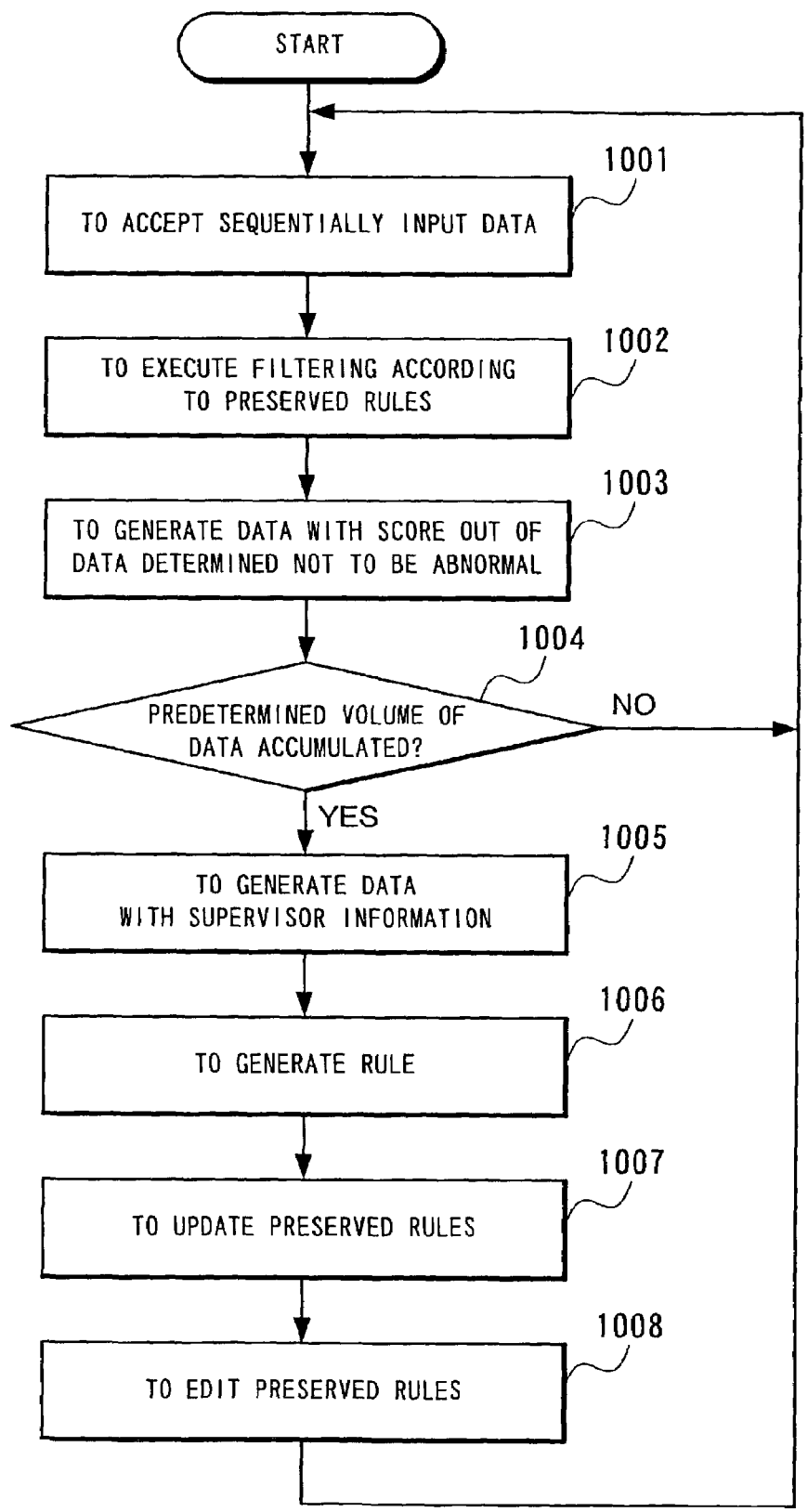
FIG. 12 is a flow chart for use in explaining operation of outlier detection in the fifth embodiment of the present invention.

Next, operation of the outlier detection device 200c of the present embodiment will be described. FIG. 12 is a flow chart for use in explaining one embodiment of operation of outlier detection according to the present embodiment.

Here, description will be given to a case where t-th data $x_t$ is transferred to a filtering unit 51 (Step 1001). More specifically, when the t-th data $V_{xt}$ is transferred to the filtering unit 51, the filtering unit 51 make determination of the applied data based on a set $R_i$ of outlier rules accumulated in the outlier rule preservation unit 55 and when determining that the data is an outlier, outputs the same as "outlier 1" and when determining that the data is not an outlier, sends the same to a degree of outlier calculation unit 52 (Step 1002).

The degree of outlier calculation unit 52 calculates a score $s_t$ for the applied data $x_t$, generates data $y_t$ with a score and applies the same to a sampling unit 53 (Step 1003). At the same time, when the score is not less than a predetermined threshold value, the unit 52 outputs the data $x_t$ as "outlier 2".

The sampling unit 53 preserves the applied data and when the number of the preserved data reaches a predetermined number, takes high score data at a predetermined rate from the set of these data to take the same as positive data and further takes a predetermined number of data starting with the lowest score data by random sampling to take the same as negative data, thereby generating data Wi with supervisor information and applying the generated data to a supervised learning unit 54 to erase all the accumulated data (Steps 1004 and 1005).

When receiving input of the labeled data $W_i$, the supervised learning unit 54 obtains a group of rules characterizing abnormal data based on the received data and selects or gives up a rule from the group by conforming to a predetermined criterion or by user's choice to send in the selected rule to the outlier rule preservation unit 55 (Step 1006).

The outlier rule preservation unit 55 adds the sent-in rule to the set $R_i$ of rules to generate and preserve a new set $R_{i+1}$ of rules (Step 1007). In addition, the user is allowed to edit the outlier rules preserved in the outlier rule preservation unit 55 by using the outlier rule editing unit 56 when necessary (Step 1008).

Although in the embodiment shown in FIG. 12, the processing of editing the rules by a user is conducted after the preserved rules are updated (Step 1007), the processing of outlier detection according to the present embodiment is not limited thereto. It is similarly possible to execute the processing of editing the rules by a user between the other steps.

As described in the foregoing, the present embodiment has an effect, in addition to the effect achieved by the fourth embodiment, of enabling rules preserved in the outlier rule preservation unit 55 to be freely edited by a user, thereby, for example, enabling automatically determined inappropriate rules to be modified or enabling users to designate an appropriate rule.

The outlier rule generation device 100 and the outlier detection devices 200, 200*a*, 200*b* and 200*c* of the above-described respective embodiments allow the functions of the filtering units 21, 31, 41 and 51, the degree of outlier calculation units 12, 22, 32, 42 and 52, the sampling units 13, 23, 33, 43 and 53, the supervised learning units 14, 24, 34, 44 and 54, the outlier rule preservation units 25, 35, 45 and 55 and the outlier rule editing units 36 and 56 and other functions to be realized not only by hardware but also by loading an outlier rule generation program and an outlier detection program which are computer programs having the respective functions into a memory of a computer processing device. The outlier rule generation program and the outlier detection program are stored in such recording media 91, 92, 93, 94 and 95 as a magnetic disc and a semiconductor memory. Then, loading the programs from the recording media to the computer processing device to control operation of the computer processing device realizes each of the above-described functions.

As described in the foregoing, the outlier rule generation device and the outlier detection device of the present invention enable rules characterizing abnormal data to be automatically generated based on data (unsupervised data) which is not known to be abnormal (unfair) or not and further enable abnormal data to be efficiently detected using the generated rules.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A computer implemented outlier rule generation device for generating a rule characterizing abnormal data in a data set, said outlier rule generation device, comprising:
    a degree of outlier calculation unit for calculating a degree of outlier for each data of said data set, said degree of outlier being indicative of a degree of being abnormal, said each data having assigned a score based on said calculated degree of outlier, said abnormal data being indicative of fraudulent data,
    a sampling unit for sampling a portion of higher scored data from said scored data and labeling said higher scored data as positive for abnormal data, and sampling a portion of lowest scored data and labeling said lowest scored data as negative for abnormal data, said positive and negative labeling being supervisor information, and
    a supervised learning unit for generating a rule characterizing abnormal data by supervised learning using both of said positive labeled data and said negative labeled data as said supervisor information.

2. A computer implemented outlier detection device for detecting abnormal data in a data set, said outlier detection device comprising:
    an outlier rule preservation unit for holding a set of rules characterizing abnormal data, said abnormal data being indicative of fraudulent data,
    a filtering unit for determining whether each data of said data set is abnormal data or not based on said held rules,
    a degree of outlier calculation unit for calculating a degree of outlier indicative of a degree of being abnormal with respect to each data determined not to be abnormal data by said filtering unit, said each data determined not to be abnormal having assigned a score based on said calculated degree of outlier,
    a sampling unit for sampling a portion of higher scored data from said scored data and labeling said higher scored data as positive for abnormal data, and sampling a portion of lowest scored data and labeling said lowest scored data as negative for abnormal data, said positive and negative labeling being supervisor information, and
    a supervised learning unit for generating a new rule characterizing abnormal data by supervised learning using both of said positive labeled data and said negative labeled data as said supervisor information and adding the new rule to said held set of rules to update the rules.

3. The outlier detection device as set forth in claim 2, wherein after repeatedly executing for a predetermined number of times a series of processing including determination of abnormal data in said data set based on said held rules, generating a new rule characterizing abnormal data based on each of said data determined not to be abnormal and updating said held rules, a determination is made whether each data of said data set is abnormal data or not based on said held rules and a determination result is output.

4. The outlier detection device as set forth in claim 2, wherein a series of processing including said determination of abnormal data, said outputting of data determined to be abnormal, said generating of a new rule characterizing abnormal data based on each said data determined not to be abnormal and said updating of said held rules is repeatedly executed a predetermined number of times with respect only to data determined not to be abnormal in preceding processing.

5. The outlier detection device as set forth in claim 2, wherein a sequentially applied data string is said set of data from which abnormal data is detected.

6. The outlier detection device as set forth in claim 5, wherein
    said filtering unit determines whether said sequentially applied data string to be examined is abnormal data or not based on said held rules,
    said degree of outlier calculation unit calculates a degree of outlier indicative of a degree of being abnormal with respect to each data determined not to be abnormal data by said filtering unit,
    said sampling unit accumulates data whose degree of outlier is calculated by said degree of outlier calculation unit and when the data is accumulated in a volume of more than a predetermined value, samples the data based on said degree of outlier calculated and applies a label indicating whether data is abnormal data or not to the sampled data, and said supervised learning unit generates a new rule characterizing abnormal data by supervised learning based on a set of said respective data to which said label is applied and adds the new rule to said held set of rules to update the rules.

7. The outlier detection device as set forth in claim 2, comprising an outlier rule editing unit for editing said held rules by user's operation.

8. A computer implemented outlier rule generation method for characterizing abnormal data in a data set, said method comprising:

calculating a degree of outlier for each data of said data set, said degree of outlier being indicative of a degree of being abnormal, said each data having assigned a score based on said calculated degree of outlier, said abnormal data being indicative of fraudulent data, sampling a portion of higher scored data from said scored data, labeling said higher scored data as positive for abnormal data, and sampling a portion of lowest scored data and labeling said lowest scored data as negative for abnormal data, said positive and negative labeling being supervisor information, and generating a rule characterizing abnormal data by supervised learning using both of said positive labeled data and said negative labeled data as said supervisor information.

9. A computer implemented outlier rule generation method for characterizing abnormal data in a data set, said method comprising:

an outlier rule preservation step of holding said set of rules characterizing abnormal data, said abnormal data being indicative of fraudulent data, a filtering step of determining whether each data of said data set is abnormal data or not based on said held rules, a degree of outlier calculation step of calculating a degree of outlier indicative of a degree of being abnormal with respect to each data determined not to be abnormal data by said filtering step, said each data determined not to be abnormal having assigned a score based on said calculated degree of outlier, a sampling step of sampling a portion of higher scored data of said scored data and labeling said higher scored data as positive for abnormal data, and sampling a portion of lowest scored data and labeling said lowest scored data as negative for abnormal data, said positive and negative labeling being supervisor information, and a supervised learning step of generating a new rule characterizing abnormal data by supervised learning using both of said positive labeled data and said negative labeled data as said supervisor information and adding the new rule to said held set of rules to update the rules.

10. The outlier detection method as set forth in claim 9, wherein after repeatedly executing a predetermined number of times a series of processing of making determination of abnormal data in said data set based on said held rules, generating a new rule characterizing abnormal data based on each said data determined not to be abnormal and updating said held rules, determination is made whether each data of said data set is abnormal data or not based on said held rules to output the determination result.

11. The outlier detection method as set forth in claim 9, wherein a series of processing of making determination of abnormal data in said data set based on said held rules, outputting data determined to be abnormal, generating a new rule characterizing abnormal data based on each said data determined not to be abnormal and updating said held rules is repeatedly executed a predetermined number of times with respect only to data determined not to be abnormal in preceding processing.

12. The outlier detection method as set forth in claim 9, wherein a sequentially applied data string is said set of data from which abnormal data is detected.

13. The outlier detection method as set forth in claim 12, wherein at said filtering step, determination is made whether said sequentially applied data string to be examined is abnormal data or not based on said held rules, at said degree of outlier calculation step, a degree of outlier indicative of a degree of being abnormal is calculated with respect to each data determined not to be abnormal data by said filtering step, at said sampling step, said data whose degree of outlier is calculated is accumulated and when the data is accumulated in a volume of more than a predetermined value, the data is sampled based on said degree of outlier calculated to apply a label indicating whether data is abnormal data or not to the sampled data, and at said supervised learning step, a new rule characterizing abnormal data is generated by supervised learning based on a set of said respective data to which said label is applied, and the new rule is added to said held set of rules to update the rules.

14. The outlier detection method as set forth in claim 9, further comprising an outlier rule editing step of editing said held rules by user's operation.

15. An outlier rule generation program embodied in a computer-readable media for generating a rule characterizing abnormal data in a data set for controlling a computer, said program comprising:

a degree of outlier calculating function for calculating a degree of outlier for each data of said data set, said degree of outlier being indicative of a degree of being abnormal, said each data having assigned a score based on said calculated degree of outlier, said abnormal data being indicative of fraudulent data, a sampling function for sampling a portion of higher scored data of said scored data, and labeling said higher scored data as positive for abnormal data, and sampling a portion of lowest scored data and labeling said lowest scored data as negative for abnormal data, said positive and negative labeling being supervisor information, and a supervised learning function for generating a rule characterizing abnormal data by supervised learning using both of said positive labeled data and said negative labeled data as said supervisor information.

16. An outlier rule generation program embodied in a computer-readable media for generating a rule characterizing abnormal data in a data set for controlling a computer, said program comprising:

an outlier rule preservation function of holding said set of rules characterizing abnormal data, said abnormal data being indicative of fraudulent data, a filtering function for determining whether each data of said data set is abnormal data or not based on said held rules, a degree of outlier calculating function for calculating a degree of outlier indicative of a degree of being abnormal with respect to each data determined not to be abnormal data by said filtering function, said each data determined not to be abnormal having assigned a score based on said calculated degree of outlier, a sampling function for sampling a portion of higher scored data of said scored data and labeling said higher scored data as positive for abnormal data, and sampling a portion of lowest scored data and labeling said lowest scored data as negative for abnormal data, said positive and negative labeling being supervisor information, and a supervised learning function for generating a new rule characterizing abnormal data by supervised learning using both of said positive labeled data and said negative labeled data as said supervisor information and adding the new rule to said held set of rules to update the rules.

17. The outlier detection program as set forth in claim 16, wherein after repeatedly executing a predetermined number of times a series of processing of making determination of abnormal data in said data set based on said held rules, generating a new rule characterizing abnormal data based on each said data determined not to be abnormal and updating said held rules, processing is executed of determining whether each data of said data set is abnormal data or not based on said held rules to output the determination result.

18. The outlier detection program as set forth in claim 16, wherein a series of processing of making determination of abnormal data in said data set based on said held rules, outputting data determined to be abnormal, generating a new rule characterizing abnormal data based on each said data determined not to be abnormal and updating said held rules is repeatedly executed a predetermined number of times with respect only to data determined not to be abnormal in preceding processing.

19. The outlier detection program as set forth in claim 16, wherein a sequentially applied data string is said set of data from which abnormal data is detected.

20. The outlier detection program as set forth in claim 19, wherein in said filtering function, processing is executed of determining whether said sequentially applied data string to be examined is abnormal data or not based on said held rules, in said degree of outlier calculating fhnction, processing is executed of calculating a degree of outer indicative of a degree of being abnormal with respect to each data determined not to be abnormal data in said filtering processing, in said sampling ftinction, processing is executed of accumulating said data whose degree of outlier is calculated and when the data is accumulated in a volume of more than a predetermined value, sampling the data based on said degree of outlier calculated to apply a label indicating whether data is abnormal data or not to the sampled data, and in said supervised learning function, processing is executed of generating a new rule characterizing abnormal data by supervised learning based on a set of said respective data to which said label is applied and adding the new rule to said held set of rules to update the rules.

21. The outlier detection program as set forth in claim 16, wherein an outlier rule editing function is executed of editing said held rules by user's operation.

* * * * *